United States Patent [19]

Salvai

[11] 4,285,764
[45] Aug. 25, 1981

[54] METHOD AND APPARATUS FOR PRODUCING CORRUGATED COMBINED BOARD

[75] Inventor: Nazzareno Salvai, S. Pietro Val Lemina, Italy

[73] Assignee: Beloit Corporation, Beloit, Wis.

[21] Appl. No.: 28,279

[22] Filed: Apr. 9, 1979

[30] Foreign Application Priority Data

Apr. 11, 1978 [IT] Italy ............................ 67801 A/78

[51] Int. Cl.³ .............................................. B31F 1/20
[52] U.S. Cl. .................................. 162/132; 162/300; 156/210; 156/470
[58] Field of Search ............... 162/133, 132, 109, 111, 162/201, 186, 184, 300; 428/153, 182; 156/210, 470

[56] References Cited

U.S. PATENT DOCUMENTS

| | | | |
|---|---|---|---|
| 1,709,934 | 4/1924 | Cumber | 156/205 |
| 1,871,702 | 8/1932 | Kallunder | 428/153 |
| 2,214,007 | 9/1940 | Ziegler et al. | 428/153 |
| 3,543,834 | 12/1970 | Stuebe | 162/300 |
| 3,619,327 | 11/1971 | Tricollet | 156/462 |
| 3,625,814 | 12/1971 | DeNoyer | 162/299 |
| 3,681,193 | 8/1972 | Nykopp | 162/133 |
| 3,690,981 | 9/1972 | DiFrank | 156/210 |
| 3,776,807 | 12/1973 | Dunning et al. | 264/128 |
| 4,126,508 | 11/1978 | Hoelzinger | 156/512 |

FOREIGN PATENT DOCUMENTS

1816917  7/1970  Fed. Rep. of Germany.
5334216  9/1978  Japan .................................. 156/210

Primary Examiner—Henry F. Epstein

Attorney, Agent, or Firm—Dirk J. Veneman; Gerald A. Mathews; Michael L. Gill

[57] ABSTRACT

A method and apparatus for continuously forming a multi-ply corrugated container board from freshly laid web plies by simultaneously forming the separate plies from aqueous slurries of fibers on corresponding foraminous fabrics, and dewatering each of them sufficiently to form a web ply capable of being handled in a papermaking machine as an integral web. All of the webs are formed on a single papermaking machine, but separately. The first web ply is laid on a traveling forming wire, such as a fourdrinier wire, and each subsequent web ply is formed in close proximity to the traveling forming wire and brought into bonding engagement seriatim with the top surface of the previously formed web ply carried on the traveling forming wire.

A typical corrugated box board has three plies with the inner ply being corrugated. In this invention, the intermediate web ply is doctored off either its forming roll or a pick-off roll and is allowed to contact the preceding layer in its characteristic fluted or corrugated configuration. A spray of adhesive material is introduced onto the first ply before the corrugated ply is brought into contact and another adhesive spray is introduced onto the top surface of the corrugating medium to bond it to the top ply.

Each layer of the multi-ply corrugated board is thus formed and built into the composite product in the forming section of a single papermaking machine. The completely formed corrugated combined board is then introduced into a suitable drying environment to finish the product.

6 Claims, 3 Drawing Figures

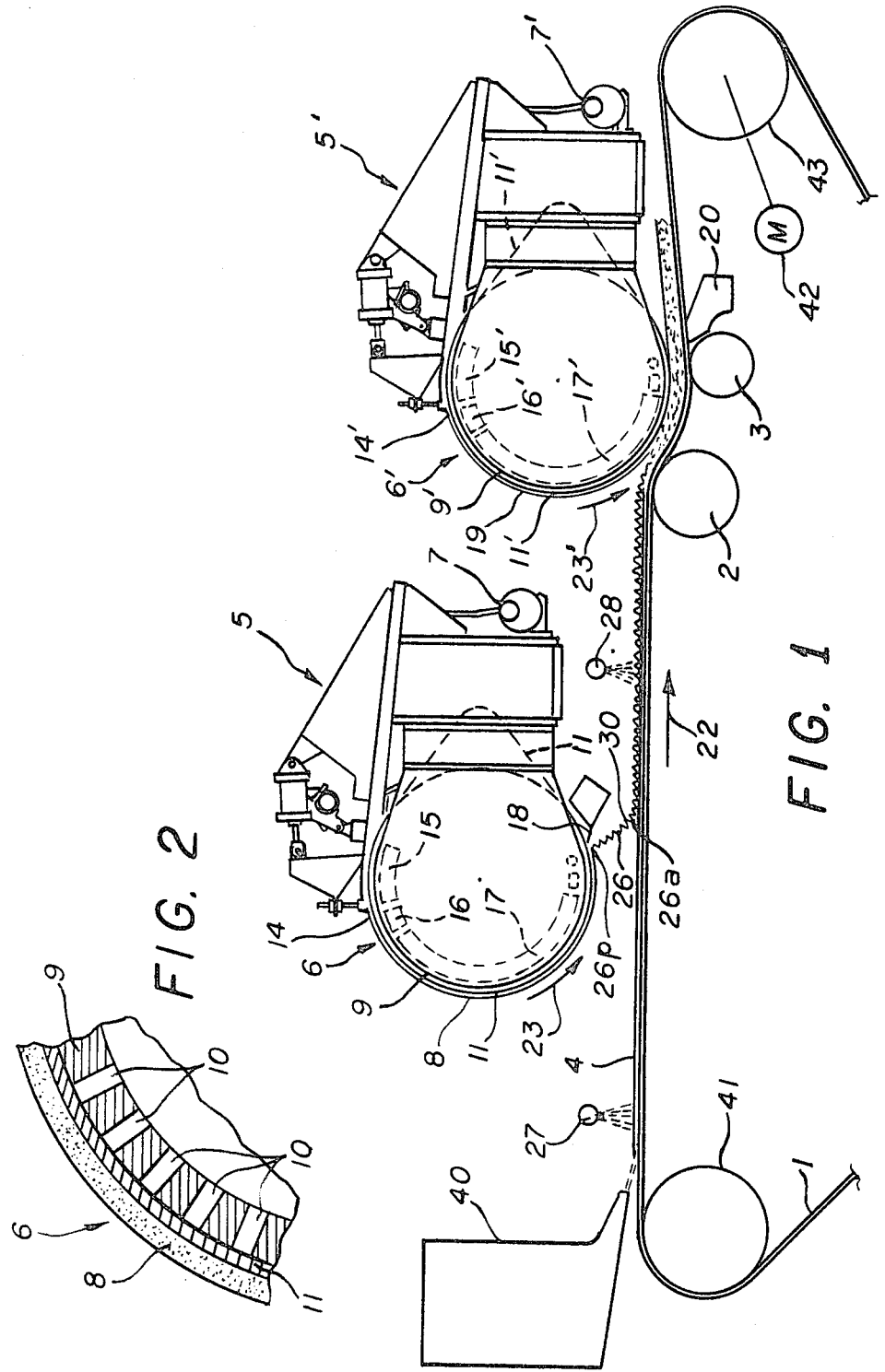

METHOD AND APPARATUS FOR PRODUCING CORRUGATED COMBINED BOARD

BACKGROUND OF THE INVENTION

This invention relates to the production of corrugated combined board. More particularly, it relates to the production of corrugated combined board on a single papermaking machine. Sometimes this type of board is referred to by other names, such as box board, corrugated container board, container board and combined board to name a few. Herein, this product will be referred to as corrugated combined board, or box board, but the invention is intended to be generic to the board product having a top and bottom liners, or linerboards, and an inner corrugated board, called corrugating medium in the papermaking industry, regardless of how it is labeled. Typically, this kind of board is used to ship bulky products, such as appliances and furniture.

Traditionally, corrugated combined board has been manufactured by producing each of the layers separately on different papermaking machines and then producing the composite board by bringing all of the board webs together on another machine and causing them to be adhesively bonded together. Indeed, in the papermaking industry, the inner, or corrugated, layer in box board is a commercial product which is manufactured exclusively on some papermaking machines in some mills. This "corrugating medium", as it is known in the trade, is produced in continuous sheets or webs and wound into rolls after it has been dried. The corrugations are then formed in the sheets by other machinery before the corrugating medium and top and bottom linerboards are brought together to form the box board.

Since box board is almost always comprised of three plies or layers—a top liner, a bottom liner and a corrugated inner layer, it now takes several machines to produce all of the layers as well as additional machines to corrugate the inner layer and glue the several layers together to form the composite box board. The top and bottom layers in a corrugated container board are commonly referred to as "linerboards" or sometimes "liners" in the paper trade. Even if all of the layers were somehow produced on a single papermaking machine, the production in terms of the composite box board would be reduced by one-third since each layer would have to be produced one at a time. In addition, each of the separate layers has to be dried separately which requires a considerable commitment in captial expenditure for drying apparatus as well as energy to dry the board webs.

SUMMARY OF THE INVENTION

This invention obviates the aforementioned problems by forming all of the layers continuously, simultaneously and sequentially on a single papermaking machine. This is accomplished by laying and dewatering the individual board webs separately so that they are sufficiently formed to enable them to be adhesively secured to one another or to have corrugations formed in them, in the case of the corrugated inner layer, without falling apart.

In the manufacture of composite, multi-ply paper board products, it is important that the individual plies be of approximately the same moisture content. This is true regardless of whether the layers are bonded with an adhesive or ply bonded by the moisture in the adjacent webs. In ply bonding, the most effective bond is produced when both bonded layers have approximately the same moisture content at the lowest consistency while the webs are wet but capable of maintaining their integrity. Such a moisture level might range from about 6% bone dry to about 16% bone dry, depending on the type of forming equipment, machine speed and pulp stock used.

In this invention, each of the web plies is separately laid, dewatered and formed in the same general area of a single papermaking machine. Accordingly, the moisture content of each web ply can be controlled so that all the webs will have approximately the same moisture content. The ply which is to be the intermediate, or corrugating medium, ply is doctored off either its forming roll or a pick-off roll to form the characteristic flutes or corrugations. The first web formed is the bottom liner which is laid onto a traveling foraminous screen, such as a horizontally arrayed fourdrinier wire. The forms producing the corrugating medium and top liner plies, respectively, are mounted above the fourdrinier wire one after the other. They are roll formers that dewater the web to the desired consistency in the 6% bone dry to about 16% bone dry (84% moisture) range. The corrugating medium is then doctored off and guided onto the bottom liner which is passing beneath on the fourdrinier wire. The next former is a roll former essentially identical to the former producing the corrugating medium and in turn places the top liner onto the corrugating medium. In the preferred embodiment, a spray of adhesive solution is applied to both the bottom liner and corrugating medium plies before the next ply is brought into contact with them in order to bond the plies into the composite corrugated combined board. The moisture in the webs also helps bond the plies together by a phenomenon known as "ply-bonding" wherein the fibrils of the pulp fibers in one ply are attracted to the fibrils of the pulp fibers in contiguous ply to cause the plies to bond together in much the same way that the individual fibers within a single ply, or web, comingle to form the individual ply itself.

The composite board is then passed out of the forming section and into a dryer of conventional design. All plies are produced at the same time so no warehouse storage is required for any previously made plies pending their being brought together on another machine to manufacture the corrugated combined board.

Accordingly, it is an object of this invention to provide a method and apparatus for producing multi-ply corrugated box board on a single papermaking machine starting with an aqueous slurry of pulp fibers for each layer.

Another object of this invention is to provide a method and apparatus for forming and corrugating the inner layer of corrugated box board while the inner layer is still in the forming section of a papermaking machine.

Still another object of this invention is to provide a method and apparatus for the simultaneous production of each layer of a multi-ply corrugated box board and the subsequent continuous combination of the separate plies into a composite corrugated box board in the forming section of a papermaking machine.

A feature and advantage of this invention is that it requires no storage for previously manufactured board webs which comprise the box board.

Another feature and advantage of this invention is that the apparatus can be adapted to manufacture box board having more than three layers by mounting additional formers downstream over the fourdrinier wire.

Still another advantage of this invention is that it permits an ordinary fourdrinier machine to be adapted to produce multi-ply corrugated box board.

These and other objects, features and advantages of the invention will become readily apparent to those skilled in the art when the description of the preferred embodiments are read in conjunction with the attached drawings.

IN THE DRAWINGS

FIG. 1 is a side elevational view of the apparatus as showing the bottom liner, corrugated, and top liner layers being formed and combined to produce the composite box board.

FIG. 2 is a partial sectional view of the forming roll shell used in the corrugating medium and top liner formers shown in FIG. 1.

DESCRIPTION OF THE PREFERRED EMBODIMENTS

Figure 3:
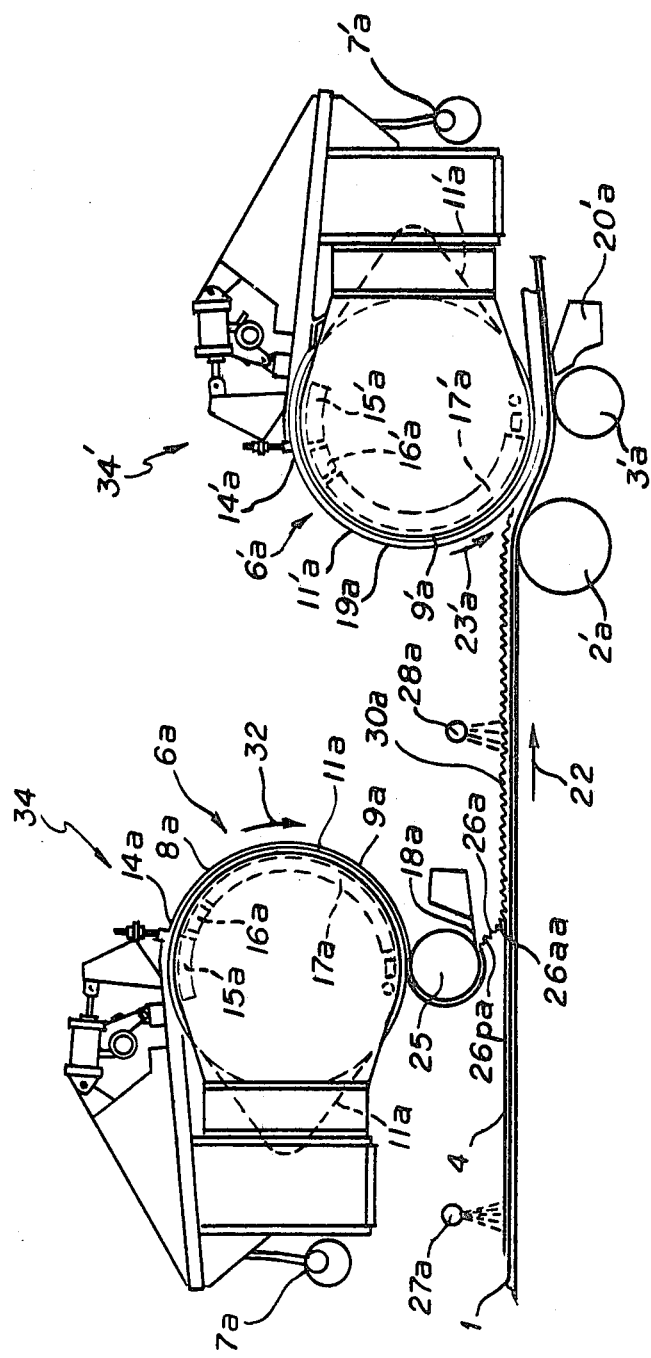
FIG. 3 is a side elevational view of apparatus similar to FIG. 1 except that the corrugating medium is creped off an intermediate pick-off roll.

As shown in FIG. 1, a looped forming wire 1, such as is used commonly on a fourdrinier-type papermaking machine, is shown traveling in the direction of arrow 22. A first water laid web 4 of fibers is formed and supported on top of wire 1 from the pulp fiber slurry discharged from headbox 40 and is being carried thereon in the same direction at the same speed. The headbox 40 and equipment, such as breast roll 41, couch roll 43 and motor 42, for moving and guiding the fourdrinier forming wire 1 and depositing the first web 4, which is the bottom liner, onto the forming wire may take any one of several forms, all of them well known to those skilled in the art in the papermaking industry. As such, they are not shown in detail and will not be described in further detail. Web 4 is formed on screen or wire 1 as the water drains through. A hydraulic former 5 is mounted in position above the traveling forming wire 1 in such a manner that its forming roll 6 rotates in the direction of arrow 23 about a horizontal axis which is parallel to the plane of the traveling forming wire 1. Forming roll 6 is spaced above the surface of traveling web 4. A supply header 7 supplies an aqueous slurry of stock fibers to the slice 14 which projects a thin stream of comingled fibers and water onto the surface of a foraminous element 11, such as a plastic or metal screen or fabric, which in turn is looped about the periphery of the cylindrical roll shell 9 which has perforations 10 uniformly positioned over its operating surface to remove water from the newly laid layer of corrugating medium 8 into the interior of the forming roll. This is shown more clearly in FIG. 2. Foraminous screen 11 is shown looped about forming roll 6 and separate therefrom, but it could also be part of the integral construction of the roll 6 surface itself.

Beneath the inner peripheral surface of forming roll shell 9, are three vacuum, or suction, boxes 15, 16 and 17. Relatively speaking, the suction in box 15 is less than box 16 which in turn has a greater suction than box 17. Naturally, the aqueous slurry of board stock contains the most water at the point where it leaves the former along the slice orifice arcuately extending substantially over the area of the forming roll surface immediately above suction box 15 for the width of the machine in the cross machine direction. Suction boxes 15, 16 and 17 similarly extend for substantially the entire length of the roll shell beneath perforations 10 so as to remove the water for the entire width of the formed web 8 of corrugating medium.

Corrugating medium is usually made from chemical or semi-chemical wood pulps, straw or reclaimed paper stock in nominal grade weights of about 26 lbs/1000 ft$^2$ and approximately 9 points thickness, although heavier weights are sometimes used. Most of the water is removed from the stock to form the corrugating medium over the suction boxes 15 and 16. Since the pulp board stock contains the most water when it is initially discharged from the slice opening onto the foraminous fabric over the cylindrical forming roll, the vacuum in the first suction box 15 need not be great to effect substantial water removal and the concomitant formation of the web on fabric 11. The web forms quite rapidly since board pulp stock is of a fairly high consistency (i.e. about 1%–1.2% fibers for corrugating medium and about 0.5% fibers for liner, both by weight of fibers to weight of mix (wet basis)), the suction in middle suction box 16 is higher in order to withdraw more of the remaining water through the resistance of the already formed board web. At this point where the web has reached the lower sector on the forming roll, the web has been dewatered to about 10%–16% bone dry and the suction in the last suction box 17 does not remove any appreciable amount of water, but is maintained at a lower level primarily to offset the centrifugal force on the web to hold it into position on the forming fabric 11. As the web reaches the region of the lower periphery on forming roll 6, a doctor 18 which is bearing against the foraminous fabric 11, intercepts the newly formed web 8 along line 26$p$ and produces the corrugations 30, or flutes, in the web which characterizes corrugating medium.

The rotational speed of forming roll 6 is such that the linear surface speed of web 8 is greater than the linear surface speed of the bottom web 4 being carried on forming wire 1. Thus, when the corrugations are produced in web 8 by the doctor 18, there is enough web material to permit the formation of corrugations, or flutes, in the web as well as a slight drape 26 between the location 26$p$ on the forming roll where the doctor contacts the web and where the corrugated web falls into contact with bottom web 4 at 26$a$.

In the preferred embodiment, the corrugating medium is adhesively secured to the bottom liner 4 and the top liner 19 which is produced on a second former 5'. This adhesive may be any suitable glue, such as latex, modified starch and is applied by a spray from nozzles 27, 28. As the corrugating medium 26 falls upon the adhesive on the bottom liner, the tips of the corrugations become adhered thereto. However, it should be noted that the bonding between the corrugating medium and the top and bottom liners is partly achieved without an adhesive under certain conditions. Such bonding is known in the paper trade as "ply-bonding" and is most conducive when the adjacent component webs have about the same moisture content and are more wet than dry. Also, it is best when the adjacent webs are of about the same stock composition. The fibrils of the still wet fibers on the adjacent webs comingle when the webs are pressed together and this effects a ply-bond. Essentially, the fibers in separate webs cause the webs to combine in the same manner in which the fibers in a single web hold it together.

In both FIGS. 1 and 3, the second, or downstream, former is identical to the former producing the corrugating medium. Therefore, the numerals referring to like components, items and features are designated with the same numerals as the former producing the corrugating medium, but the numerals are primed in order to designate the particular former being referred to. Further, in the embodiment shown in FIG. 3, the numerals referring to like components, items and features also have a subscript "a" for the same reason. The formers themselves in FIGS. 1 and 3 are designated with separate numerals.

Former 5' produces a top liner web 19 on forming roll 6' which rotates in the direction of arrow 23' at a linear surface speed matching the speed of bottom liner 4. Former 5' is mounted to bear against and distend the forming wire 1, bottom liner 4 and corrugating medium 26 downwardly over a portion of its arcuate surface between a span defined by two guide rolls 2, 3 over which the forming wire and newly formed composite container board pass as the upper liner 19 is pressed onto the upper flutes of corrugating medium 26 which are adhesively coated by the spray from nozzle 28. This positively effects adhesion between the top and bottom liners 19, 4, respectively, to the corrugating medium 26.

Although the plies are bonded together under the combined effect of the adhesive and the moisture in the plies themselves, the moisture will have the predominate bonding effect between the bottom liner and the corrugating medium while the adhesive will have the predominate bonding effect between the corrugating medium and the top liner. A suction box 20 is mounted beneath the forming wire 1 after the last guide roll to ensure that the composite board web remains on the forming wire for transfer into the drying section of the papermaking machine. The remainder of the papermaking machine downstream from the last former 5', which in this case consists primarily of drying, reeling and slitting apparatus are of a design and configuration which are well known in the papermaking industry, as are their operational characteristics. Such apparatus form no part of the present invention and, accordingly, will not be discussed in further detail.

A variation of the embodiment shown in FIG. 1 is illustrated in FIG. 3. Former 34 shown in FIG. 3 is identical to the former 5 shown in FIG. 1 except that it is turned around so that forming roll 6a rotates in the direction 32 opposite to that of the forming roll on former 5 shown in FIG. 1. The only operational difference between formers 34 and 5 is the presence of a pick-off roll 25 on former 34 which is mounted to nip against the corrugating medium web over the lower portion of the forming roll 6a surface to pick-off the web 8a to reverse its direction to travel in the same direction as bottom liner 4. A doctor 18a bears against the surface of pick-off roll 25 to form the flutes or corrugations in web 8a along line 26pa before the web falls into contact with the traveling bottom liner 4 at 26aa. The advantage of the use of the pick-off roll 25 is that the doctor then bears against its smooth, continuous cylindrical surface and does not touch the foraminous forming fabric 11a as the doctor does on former 5 in FIG. 1. This precludes any potential wearing or tearing of the forming fabric.

In both the embodiments shown in FIGS. 1 and 3, the formation of the webs in formers 34, 34' and 5, 5=, respectively, is the same as is the manner in which the adhesive is applied to the bottom liner and corrugating medium to effect bonding between the corrugating medium and the bottom and top liners to form the composite corrugated combined board. Either embodiment can be expected to produce this board at speeds of about 300 fpm to about 1200 fpm. The moisture level in the top linerboard will range from about 88% to 94%. The moisture level in the corrugating medium will range from about 84% to about 88% and from about 86% to about 90% in the top linerboard.

Thus, a method and apparatus for manufacturing corrugated combined board having an inner corrugating medium bonded to top and bottom liners has been described. Clearly, this invention can be utilized to make more than three ply board. Merely by adding another corrugating medium former after the last liner former and then another liner former, a five ply corrugated board can be made.

What is claimed is:

1. Apparatus for the continuous production of multiply corrugated combined board, having at least a bottom linerboard and a top linerboard with an intermediate corrugating medium, from corresponding slurries of aqueous pulp fiber stock, comprising, in combination:

a looped foraminous forming wire for traveling and receiving an aqueous slurry of pulp fibers to form a bottom linerboard thereon;

means for supplying an aqueous slurry of pulp fibers to the foraminous forming wire;

means for forming a corrugating medium from a dilute aqueous slurry of pulp fibers, said means including a first foraminous surface for traveling, a former for supplying the aqueous slurry of pulp fibers to the first foraminous surface and means for removing the water from the slurry of pulp fibers through the first foraminous surface to form the corrugating medium having an inner surface disposed thereon and an outer surface; means for receiving the corrugating medium traveling on the first foraminous surface and producing corrugations therein, said means for producing the corrugations being disposed relative to the forming wire such that the outer surface of the traveling corrugating medium is thereafter brought into contact with the bottom linerboard;

means for forming a top linerboard from a dilute aqueous slurry of pulp fibers, said means including a second foraminous surface for traveling, a former for supplying the aqueous slurry of pulp fibers to the second foraminous surface and means for removing the water from the slurry of pulp fibers through the second foraminous surface to form the top linerboard having an inner surface disposed thereon and an outer surface, said second foraminous surface disposed to urge the outer surface of the top linerboard into contact with the corrugating medium web;

means for bonding the corrugating medium to the top and bottom linerboards to thereby form the corrugated combined board on the forming wire from aqueous slurries of pulp fibers;

said first foraminous surface travels at a linear speed which is faster than the linear speed of the forming wire whereby the corrugated corrugating medium is traveling at the same speed as the bottom linerboard when they come into contact.

2. The apparatus as set forth in claim 1, wherein:

both of said means for forming the corrugating medium and said means for forming the top linerboard comprise a looped foraminous fabric and a rotatable forming roll having a foraminous surface disposed within the looped fabric, and a suction box within the forming roll for urging water from the aqueous slurry and through the fabric and roll surface to form the corrugating medium and top linerboard on the foraminous fabrics.

3. The apparatus as set forth in claim 1, wherein: the means for receiving the corrugating medium comprises a doctor which bears against the traveling foraminous surface to produce the corrugations in the corrugating medium.

4. The apparatus as set forth in claim 3 further including:
a pick-off roll mounted in nipping engagement with the first traveling foraminous surface to thereby receive the corrugating medium; and
said doctor engages the corrugating medium on the surface of the pick-off roll to thereby form the corrugations therein.

5. Apparatus for the continuous production of multiply corrugated combined board, having at least a bottom linerboard and a top linerboard with an intermediate corrugating medium, from corresponding slurries of aqueous pulp fiber stock, comprising, in combination:
a looped foraminous forming wire for traveling and receiving an aqueous slurry of pulp fibers to form a bottom linerboard thereon;
a headbox for discharging an aqueous slurry of pulp fibers to the foraminous forming wire;
a former for forming a corrugating medium,
said former including
(a) a rotatably mounted forming roll having a foraminous surface for receiving water therethrough,
(b) a first foraminous fabric looped about the forming roll,
(c) a pulp stock header and slice for supplying a uniform aqueous dispersion of pulp fibers to the surface of the first foraminous fabric to form the corrugating medium thereon,
(d) at least one suction box operably positioned within the forming roll for urging water from the aqueous pulp slurry through the first foraminous fabric and forming roll surface to assist formation of the corrugating medium having an inner surface disposed on the first foraminous fabric and an outer surface,
(e) means for rotating the first foraminous fabric so that the linear speed of the corrugating medium formed thereon is faster than the linear speed of the bottom linerboard on the forming wire;
a doctor for intercepting the corrugating medium and producing corrugations therein so that the corrugated corrugating medium traveling beyond the doctor travels at substantially the same linear speed as the bottom linerboard, said doctor being disposed relative to the corrugating medium former so that the corrugated corrugating medium falls with its outer surface upon the bottom linerboard;
a former for forming a top linerboard, said former including
(a) a rotatably mounted forming roll having a foraminous surface for receiving water therethrough,
(b) a second foraminous fabric looped about the forming roll,
(c) a pulp stock header and slice for supplying a uniform aqueous dispersion of pulp fibers to the surface of the second foraminous fabric to form the top linerboard thereon,
(d) at least one suction box operably positioned within the forming roll for urging water from the aqueous pulp slurry through the second foraminous fabric and forming roll surface to assist formation of the top linerboard having an inner surface disposed on the second foraminous fabric and an outer surface,
(e) means for rotating the second foraminous fabric,
said second foraminous fabric being urged against the corrugating medium on the bottom linerboard of the forming wire whereby the outer surface of the top linerboard is brought into contact with corrugating medium;
at least one spray nozzle operably disposed above both the bottom linerboard and corrugating medium for spraying an adhesive onto their surfaces whereby the corrugating medium is bonded to both the top and bottom linerboards to thereby form the corrugated combined board on the forming wire from aqueous slurries of pulp fibers.

6. A method for the continuous production of a multiply corrugated combined board, having at least a bottom linerboard and a top linerboard with an intermediate corrugating medium, from corresponding slurries of aqueous pulp fiber stock, comprising the steps:
forming a bottom linerboard and conveying it upon a traveling foraminous forming wire;
discharging an aqueous fiber slurry of corrugating medium stock upon a first traveling foraminous surface and dewatering the stock thereon to form the corrugating medium, said corrugating medium having an inner surface on said first foraminous surface and an outer surface;
removing the corrugating medium from the first foraminous surface and forming corrugations therein whereby said corrugating medium is formed at a speed substantially equal to the linear speed of the bottom linerboard on the foraminous forming wire;
bonding the outer surface of the corrugating medium to the bottom linerboard;
discharging an aqueous slurry of top liner board stock upon a second traveling foraminous surface and dewatering the stock thereon to form the top linerboard, said top linerboard having an inner surface on said second foraminous surface and an outer surface;
bonding the top linerboard to the corrugating medium to thereby form the corrugated combined board on the forming wire where the moisture level of the webs ranges from about 84% to about 94%.

* * * * *